(No Model.)

J. D. RANKIN & W. C. KNOX.
SOIL PULVERIZER.

No. 293,080. Patented Feb. 5, 1884.

WITNESSES:
Robert Kirk
C. S. Zerk

INVENTOR:
John Dake Rankin
William C. Knox
By J. S. Zerk
Attorney.

United States Patent Office.

JOHN DAKE RANKIN AND WILLIAM CUSTIS KNOX, OF GROESBECK, TEXAS.

SOIL-PULVERIZER.

SPECIFICATION forming part of Letters Patent No. 293,080, dated February 5, 1884.

Application filed July 20, 1883. (No model.)

*To all whom it may concern:*

Be it known that we, JOHN DAKE RANKIN and WILLIAM C. KNOX, of Groesbeck, in the county of Limestone and State of Texas, have invented a new and useful Improvement in Soil-Pulverizers, which improvement is fully set forth in the following specification and accompanying drawings, in which—

Figure 1:
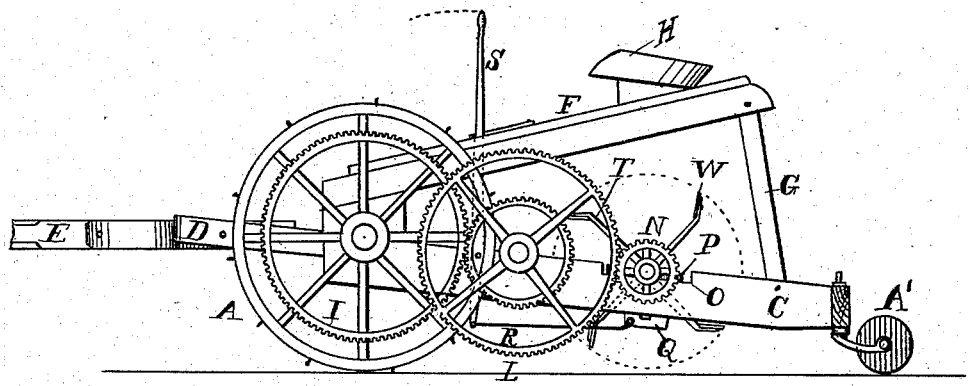
Figure 2:
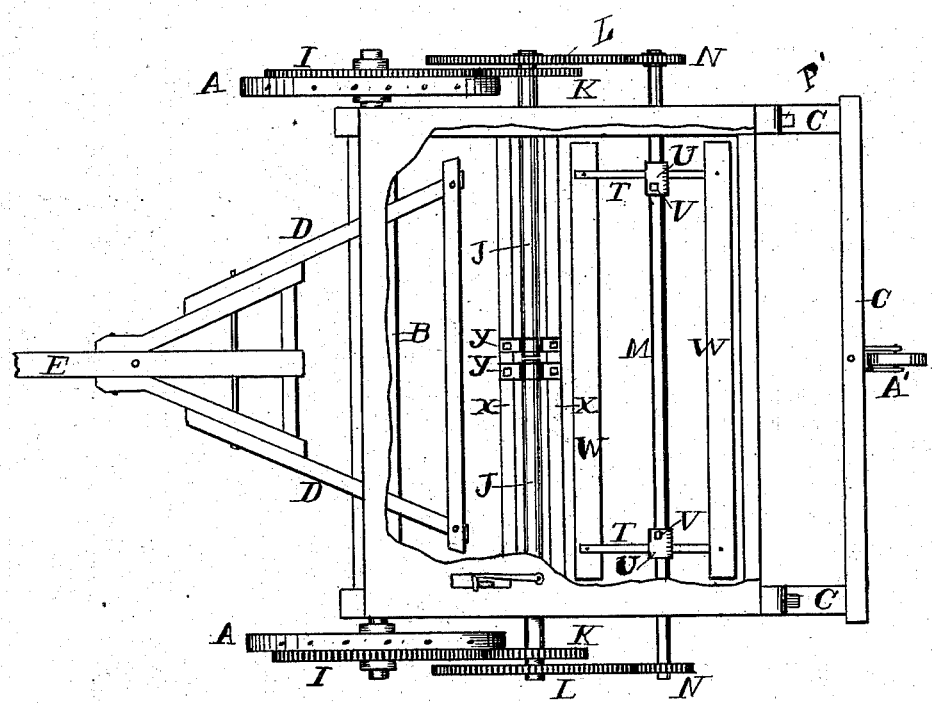

Figure 1 is a side view of our soil-pulverizer, and Fig. 2 is a plan view.

The object of our invention is to provide a soil-pulverizer that can be operated in a variety of soils.

A A are drive-wheels, upon which the machine travels, provided with lugs or projections on the periphery of the wheels, which enable them to take a firm hold upon the ground. A small wheel, A', is placed in the rear of the machine to regulate and aid in turning the same. The axle B, upon which the drive-wheels A A revolve, forms the forward part of the frame-work carrying the pulverizing mechanism. The hounds D D, carrying the tongue E, are made in the usual manner and framed into the upper side of the axle B. The frame-work C is made of wood or any suitable material, and connected in a substantial manner to the axle B. The wood platform F, resting and securely fastened at its forward end upon the axle B and end of the side pieces, C, extends rearward and is inclined at any suitable angle with the frame C. The rear end of the platform F is supported by the posts G. Upon this platform a seat, H, is provided for the operator. The drive-wheels A have an external gear-wheel, I.

In the rear of the axle B are two pieces, X X, framed into the side pieces, C. Between these pieces, extending from either side of the machine and journaled to the upper face of the side pieces, C, are the transverse shafts J J. Their inner ends are secured in position by means of the journal-boxes Y Y. By these means the machine can be conveniently turned around, when wheels N are disengaged from wheels L.

On the outside of the pinions K, and securely fastened to the shaft J, are gear-wheels L. At a suitable distance in the rear of the shaft J is a transverse shaft, M, journaled to the frame-work C. The pinions N are securely fastened on the shaft M in the same plane and mesh in the gear-wheels L. The longitudinal side beams of the frame C are recessed at O, to receive journal-boxes P, which are longitudinally adjustable, and provided with lugs Q, which extend through slots made through said side bars. The lower ends of the lugs Q are provided with keys to hold them in position. A rod, R, connecting with the lug Q, extends to the lever S, which is manipulated by the operator on the platform. By this means the pinions N may be thrown in and out of gear.

On each end of the shaft M, within the frame, are the sleeves U, secured to the shaft by means of the bolt or screws V. Extending from this sleeve, and at right angles with the shaft M, are four or more arms, T. Transversely across the machine, within the frame-work, are the steel knives or pulverizers W, securely fastened to the arms.

Instead of extending transversely across the machine and secured to opposite arms, the knives may be placed spirally on the shaft M, thereby equalizing the shock of the knives against the soil. The opposite side of the machine may have similar gear and pinion wheels, while both ends of the shaft M may have movable journal-boxes with levers attached, so that they may be thrown in and out of gear, as desired.

What I claim as new is—

1. In soil-pulverizers, the combination of rotating blades on a shaft adjustable forward and backward, the driving-wheel shaft B, the intermediate operating mechanism, and the two transverse shafts J J, substantially as described.

2. The combination of the driving-wheels, the multiplying gear-wheels, the two shafts J J, blades W, shaft M, adjustable forward and backward by means of a lever, S, frame C, having recesses for journal-boxes P, the lugs Q on the latter, and the connecting-rod R, all constructed and adapted to operate substantially as described.

In testimony that we claim the foregoing we have hereunto set our hands this 28th day of May, 1883, in the presence of witnesses.

JOHN DAKE RANKIN.
WILLIAM CUSTIS KNOX.

Witnesses:
JOHN FOWLER,
W. M. HARKER.